United States Patent [19]
Andrey

[11] Patent Number: 5,769,436
[45] Date of Patent: Jun. 23, 1998

[54] MOVABLE DEVICE OF THE MOVABLE PARASOL STAND TYPE WITH CONCEALED WHEELS

[75] Inventor: Jean-Pierre Andrey, Saint Paul En Foret, France

[73] Assignee: Androll, Saint Paul en Foret, France

[21] Appl. No.: 716,452

[22] PCT Filed: Mar. 30, 1995

[86] PCT No.: PCT/FR95/00409

§ 371 Date: Sep. 27, 1996

§ 102(e) Date: Sep. 27, 1996

[87] PCT Pub. No.: WO95/27169

PCT Pub. Date: Oct. 12, 1995

[30] Foreign Application Priority Data

Mar. 31, 1994 [FR] France ................................. 94 04269

[51] Int. Cl.[6] ........................................... B62B 1/22
[52] U.S. Cl. ................................... 280/47.17; 280/47.34; 280/47.35; 280/641; 280/47.18
[58] Field of Search ..................... 280/5.32, 30, 47.34, 280/47.33, 47.35, 651, 79.2, 79.3, 640, 641, 47.18, 47.17; 211/133, 128, 206; 296/20; 414/498

[56] References Cited

U.S. PATENT DOCUMENTS

| | | | |
|---|---|---|---|
| 2,993,740 | 7/1961 | Good | 311/60 |
| 3,424,474 | 1/1969 | Karnow et al. | 280/79.2 |
| 3,727,946 | 4/1973 | Hearn | 280/408 |
| 3,752,527 | 8/1973 | Ferneau et al. | 296/20 |
| 4,037,851 | 7/1977 | Romero | 280/79.3 |
| 4,369,985 | 1/1983 | Bourgraf et al. | 280/641 |
| 4,588,197 | 5/1986 | Benedetto, Jr. | 280/47.18 |
| 4,921,264 | 5/1990 | Duffy | 280/79.11 |
| 5,104,135 | 4/1992 | Sheets | 280/47.19 |
| 5,464,104 | 11/1995 | McArthur | 211/133 |
| 5,480,170 | 1/1996 | Kaiser, II | 280/30 |
| 5,611,561 | 3/1997 | Dale, II | 280/652 |

FOREIGN PATENT DOCUMENTS

| | | |
|---|---|---|
| 2604426 | 4/1988 | France . |
| 682975 | 12/1993 | Switzerland . |
| 103876 | 3/1917 | United Kingdom . |
| 1136591 | 12/1968 | United Kingdom . |
| 9212311 | 7/1992 | WIPO . |

*Primary Examiner*—Brian L. Johnson
*Assistant Examiner*—Bridget Avery
*Attorney, Agent, or Firm*—Ladas & Parry

[57] ABSTRACT

Movable device with retractable wheels so as to easily move a bulky or heavy object such as a parasol stand, comprising a framework resting on the ground in the rest position, and a movable system comprising a movable part (18) rotating about a pivot axis (20) which is secured to the framework, two wheels (22) each of which is free to rotate about an axis (24) fixed to a first end of the movable part, an abutment member located at a second end of the movable part, and blocked by the framework when moving upwards, and a lever (16) which is fast with the movable system in an intermediate position between the pivot axis and the end of the abutment member, such that a force applied to the lever makes it possible to raise the framework with respect to the wheels resting on the ground and to move the object towards another location by running the wheels on the ground.

10 Claims, 2 Drawing Sheets

5,769,436

MOVABLE DEVICE OF THE MOVABLE PARASOL STAND TYPE WITH CONCEALED WHEELS

This application is a 35 USC 371 of PCT/FR95/00409 filed on Mar. 30, 1995.

TECHNICAL FIELD

The present invention concerns the movable devices of the retractable wheel type and more precisely a movable parasol stand with retractable and concealed wheels.

1. Prior Art

Conventional parasol stands are generally static and difficult to move. Some stands that nevertheless offer a good laying, can be source of damages when moved, such as backaches, ground damages, or risks of accidents.

There is however on the market parasol stands mounted on retractable wheels, such as the one described in Patent CH-A-682.975, in which the three retractable wheels are lowered on to the ground when operating a lever that itself lifts the stand by means of a Rack & Pinion device. However, such a stand has many movable and articulated parts that make it complex and are bound to dysfunction. Moreover, this stand is not easy to control when moved because the three wheels are not always directed in the same direction, and also because the lever serving to lower the wheels is not adapted to easily move the stand.

2. Invention Presentation

The aim of the invention is therefore to carry out a parasol stand or any other heavy object to move, that does not have any movable and articulated parts and that is easy to move.

Therefore the aim of the invention is a movable device with retractable wheels designed to move a heavy or bulky object, more precisely a parasol stand, of the type that includes a framework resting on the ground in the rest position, and a movable system with retracted wheels in the rest position, that rests on the ground when the movable system is operated to move the object. The movable device comprises a movable part that rotates about a pivot axis secured to the framework; at least two wheels, each in free rotation about an axis fixed to a first end of the movable part; an abutment member located on a second end of the movable part and blocked in its upper movement by the framework and a lever firmly attached to the movable system at a point located at an intermediate position between the pivot axis of the movable system and the abutment member. Thus, a force applied downwards on the lever will, thanks to the bearing constituted by the abutment member that is blocked by the retaining element of the framework, allow to raise the framework while at the same time the wheels are lowered to the ground, in order to move the object to another location while running the wheels on the ground.

BRIEF DESCRIPTION OF THE FIGURES

The aims, objects and characteristics of the invention will appear more clearly upon reading the following description made in reference with the drawings in which.

DETAILED DESCRIPTION OF THE INVENTION

Figure 1A:
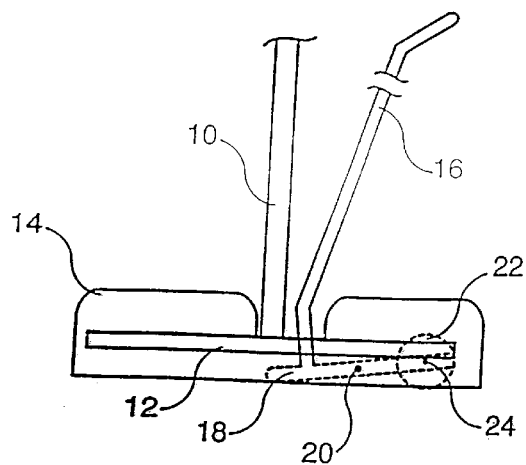
FIG. 1a is a schematic representation of the device of the invention in the static position.
Figure 1B:
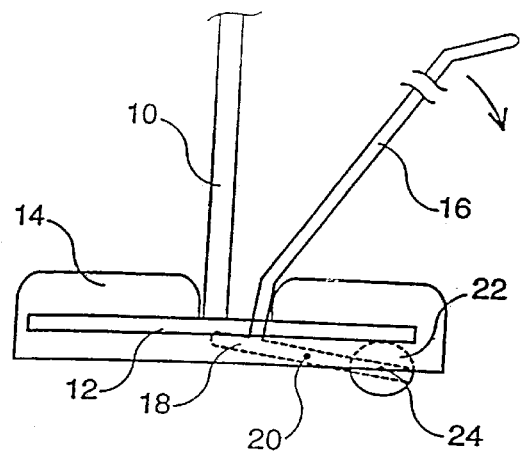
FIG. 1b is a schematic representation of the device of the invention in the moving position.

The device according to the invention which is a parasol stand, represented schematically in the rest position in FIG. 1a and in the moving position in FIG. 1b, includes essentially two parts, one framework that is mostly composed of the object to be moved and that is heavy enough not to be moved alone easily, and a movable system articulated about an axis secured to the framework.

In the example of FIGS. 1a and 1b, the framework includes the mast of the parasol mounted on a metallic structure 12 that is integrated in a frame 14 that can be made of a rigid casing filled with water, sand or concrete, whereby it has a certain weight that prevents the parasol from collapsing because of the wind, when the framework rests on the ground, as described in FIG. 1a.

The movable system consists of a lever 16 fixed perpendicularly to a movable part 18 articulated about one or more axes 20 that are secured to the framework. The movable system also includes two wheels 22, which are each in free rotation about an axis 24 located at the end of the movable part 18. When applying a force on the lever 16 in the direction of the FIG. 1b arrow, the end of the movable part 18, by pivoting about the axis 20, comes to stop on the metallic structure. At this point, the wheels 22 come out of their housings to rest on the ground. The force applied on the lever 16 then allows to raise the stand of which the framework is also raised upwards owing to the movable part 18. In this position, it becomes easy to maintain the stand in balance, thanks to the lever 16, and to move it effortlessly with a mere traction or thrust from the user. It should be noted that during the passage from the rest position (FIG. 1a) to the moving position (FIG. 1b) everything happens as if the user's effort was reduced thanks to a first lever effect whose bearing is the axis 20, and then thanks to a second lever effect whose bearing is the wheel 22.

When reaching the desired location, the user by releasing the pressure on the lever 16, allows the stand to come to rest on the ground in the static position, and the wheels to retract inside the frame 14, and thereby to conceal them.

Figure 2:
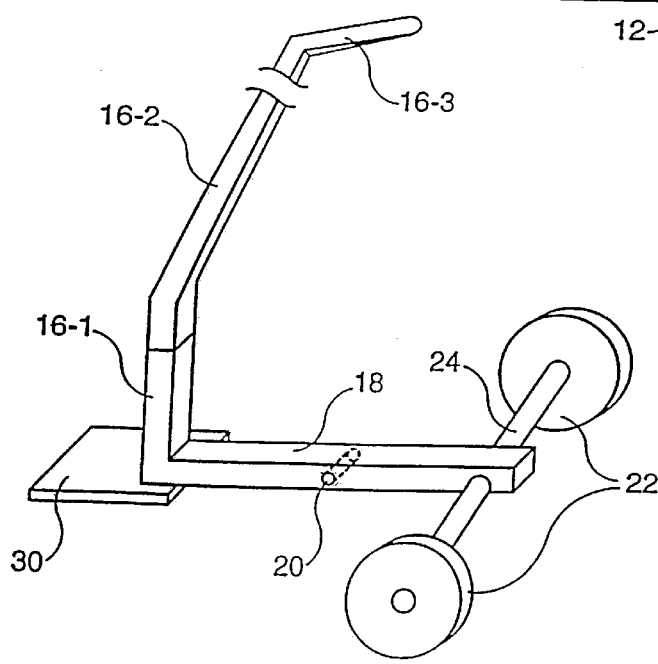
FIG. 2 is a perspective representation of the movable system of the device of the invention according to a first embodiment.
Figure 3:
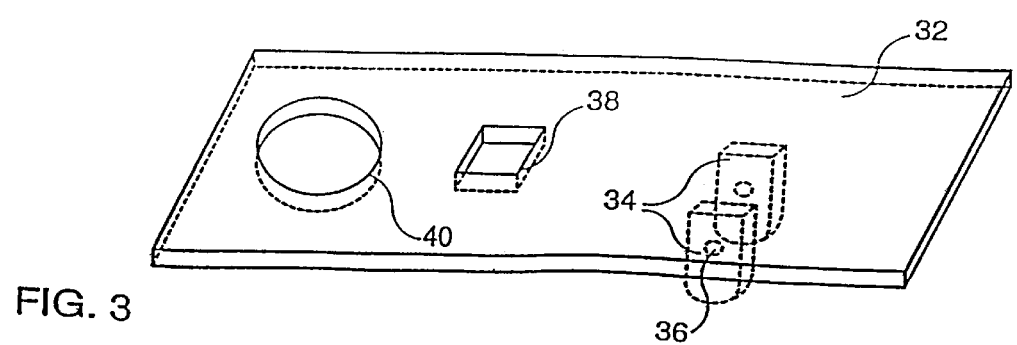
FIG. 3 is a perspective representation of the framework support used in the device of the invention according to the first embodiment.

In a preferred embodiment of the invention described in FIGS. 2 and 3, the movable system is formed of the movable part 18 constituted of a metallic bar articulated about the axis 20. A metallic tab 30 designed to lift the stand framework is fixed at the end of the bar 18. The lever 16 secured to the metallic bar 18 is removable and includes three parts: part 16-1 that is the continuation according to an angle included between 75° and 90° (preferably 84°) of the bar 18, on which is fitted the upright part 16-2, itself ended by part 16-3 which serves as a handle for the user. Each part forms a determined angle with the following part, in order to limit the user's effort, and the length of the lever depends on the required effort, and thus of the weight of the object to be move.

In this embodiment, the stand framework is supported by a metallic plate 32 shown in FIG. 3, that includes two metallic tabs 34 welded on the lower face thereof and provided with the hole of an axis 36 designed to receive axis 20 about which pivots the bar 18 and the movable system as a whole. The plate 32 further comprises a square or rectangular recess 38, that will let the part 16-1 of the lever 16 through and free to move. Finally, the plate 32 comprises a circular recess 40 in which the parasol mast is placed, preferably fixed below the plate 32 with a circular plate whose diameter is greater that the diameter of the mast.

Figure 4:
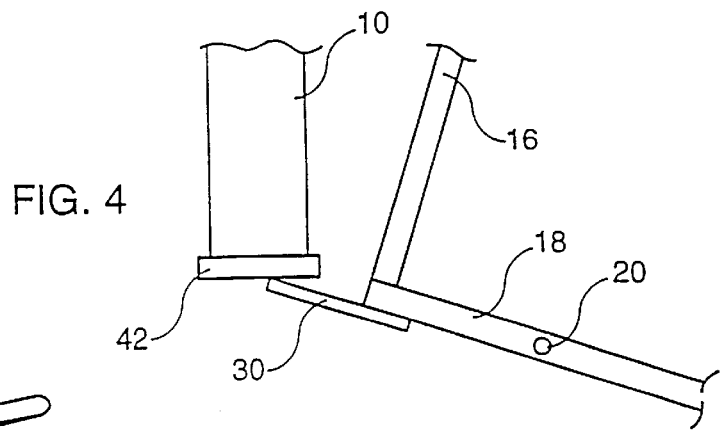
FIG. 4 is a schematic representation showing the raising action of the framework done by the movable system when operating the lever of the device of the invention.

As schematically shown in FIG. 4, when the user applies a force downwards on the lever 16, the metallic tab 30 which is integral with the metallic plate 18, lifts the framework resting below the circular plate 42, which is at the base of the mast 10 and which is fixed below the metallic plate 32. Thus it is necessary that the fixing point of the lever 16 on the part 18 be at an intermediate position between the pivot axis 20 and the end of the plate 30 coming in contact with the tab 30 in order to lift the framework.

Figure 5:
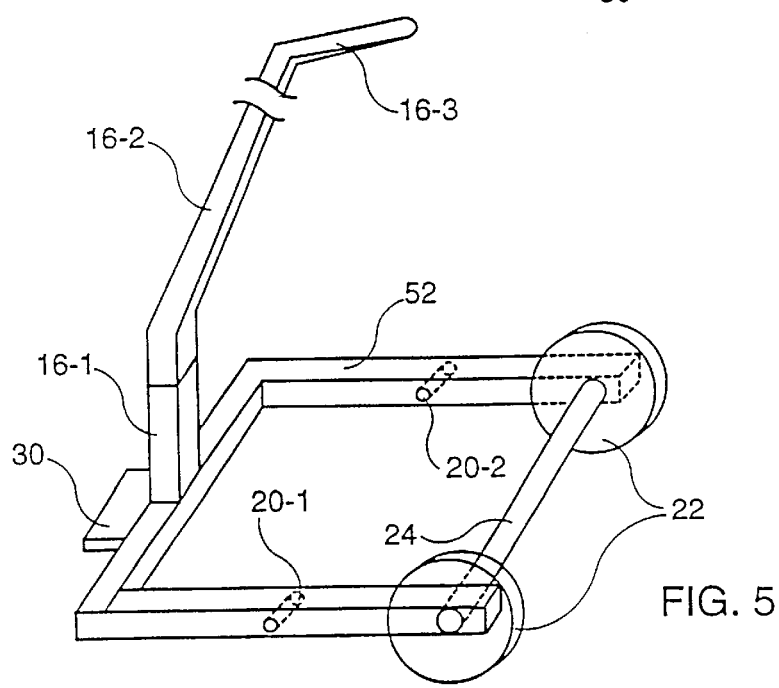
FIG. 5 is a representation in perspective of the movable system of the device of the invention according to a second embodiment.
Figure 6:
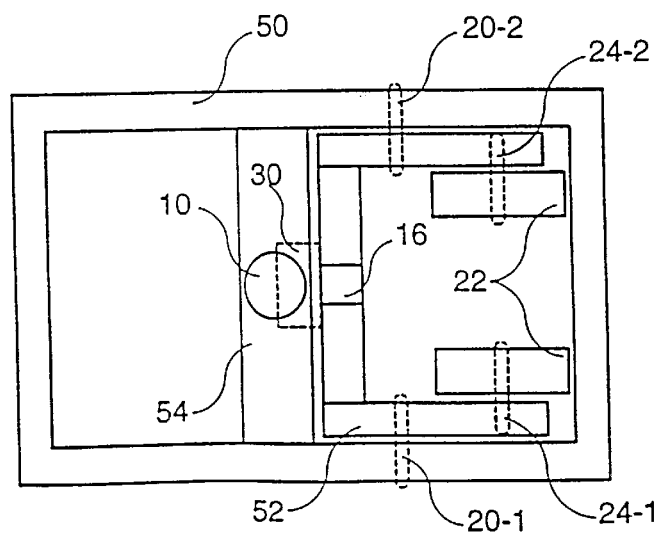
FIG. 6 is a top view in section representing schematically the device of the invention according to the second embodiment.

A second embodiment is shown in FIGS. 5 and 6, in which the plate 32 (see FIG. 3) is replaced with a frame 50 and the metallic bar 18 (see FIG. 2) is replaced with a U shape element 52. In this embodiment, the mast 10 is supported by a transverse bar 54 fast with the frame 50, said bar serving as a bearing for lifting the parasol framework.

The two branches of the U shape element 52 on which is fixed the lever 16 in three parts 16-1,16-2 and 16-3, as seen previously, rotate inside the frame 50 about two axes 20-1 and 20-2, placed respectively in two holes on both sides of the frame 50. The U-shape element 52 has at the end of each of its branches a free rotating wheel 22 about its respective axis 24-1 or 24-2 fast with each branch of the element. Finally the U-shape element 52 has a metallic tab 30 fixed at the end of the frame that includes the bar linking the two branches and designed to lift the frame 50, and thus the stand framework, by applying a force upwards under the transverse bar 54, while the wheels 22 are lowered and rest on the ground.

It should be noted that in this second embodiment, the transverse bar 54 that is secured to the frame 50 is located in a position that enables a balanced distribution of the frame and object weight when the assembly moves.

Some amendments might be made to the invention as it was described according to two embodiments. Thus, the wheels could be replaced by runners, with curved ends in order to make it easier for the stand to move on snow or sand by sliding.

Although the two described embodiments relate to a parasol stand, it is obvious that the invention can be adapted to other bulky or heavy objects that have to be moved from one location to another. Thus the invention can very easily be adapted to window boxes, flowerpots, or advertising panels. It can even be adapted to table legs, allowing the table to be moved easily while at the same time being steadied in the static position. In the case of a window box, the lever should advantageously be placed outside of the stand, for instance with a fork fixed on the sides of the frame serving as a support for the framework, the lever then being removable and fixed to the frame alone when the window box has to be moved. The system may also be fitted with four wheels instead of two.

I claim:

1. A movable apparatus including a framework that rests on the ground when in a rest position, and a movable system which is provided with wheels in the rest position which rest on the ground when the movable system is operated to move an object; the movable system includes:

a movable part rotating about at least one pivot axis which is secured to said framework;

at least two wheels each of them being in free rotation about an axis that is fixed to a first end of said movable part;

abutment means located at an opposite end of said movable part and rotatable with the movable part for engaging a retaining element of said framework so as to raise the framework when the abutment means is rotated upwardly, said abutment means comprising an engaging portion that contacts the retaining element when the abutment means is rotated upwardly and lever means, integrally formed with and secured to said movable part at a position opposite to the wheels with respect to said pivot axis and including a lever rotatable in a downward arc in response to a force, for rotating the movable part such that, when the lever rotates in the downward arc, said movable part rotates about the at least one axis with the abutment means rotating upwardly to engage said retaining element whereby a force can be applied against the lever to raise said framework with respect to said wheels resting on the ground, and to move said framework and said object to another location by running the wheels on the ground.

2. Apparatus according to claim 1, in which said lever includes three parts, including a handle part to apply the force to raise said framework, the three parts being disposed with respect to each other in an angular configuration that facilitates use of the lever to raise the framework with minimal force.

3. Apparatus according to claim 1, in which said framework is a metallic plate having a lower face, said lower face including two metallic tabs each of which is provided with a hole to receive said pivot axis, said movable part being a metallic bar that can rotate about said pivot axis located in said holes.

4. Apparatus according to claim 1, in which said framework is a metallic frame and said movable part is a U-shape metallic element, said U-shape metallic element having two branches each of which has a wheel that is linked to said frame by a second pivot axis.

5. Apparatus according to claim 4, in which said retaining element is a transverse bar fast with said frame located in a position of said frame that allows a balanced distribution of the frame and object weight when the assembly moves.

6. Apparatus according to claim 1, further including a frame that is fast with said frame work and that makes said wheels invisible on the outside.

7. Apparatus according to claim 1, in which said object is a parasol.

8. Apparatus according to claim 7, in which said frame is a casing filled with water, sand or concrete, in order to give a better stability to the parasol in the static position.

9. Apparatus according to claim 1, in which the object is a window box.

10. A movable apparatus as claimed in claim 1, wherein the lever means is secured to said movable part at a position between the pivot axis and the engaging portion of said abutment means.

* * * * *